(12) United States Patent
Umei et al.

(10) Patent No.: US 12,173,777 B2
(45) Date of Patent: Dec. 24, 2024

(54) LINEAR MOTION ACTUATOR

(71) Applicant: NSK LTD., Tokyo (JP)

(72) Inventors: Reona Umei, Kanagawa (JP); Yasumi Watanabe, Kanagawa (JP); Yuji Shimomura, Kanagawa (JP)

(73) Assignee: NSK LTD., Tokyo (JP)

( * ) Notice: Subject to any disclaimer, the term of this patent is extended or adjusted under 35 U.S.C. 154(b) by 44 days.

(21) Appl. No.: 18/026,463

(22) PCT Filed: Oct. 20, 2021

(86) PCT No.: PCT/JP2021/038690
§ 371 (c)(1),
(2) Date: Mar. 15, 2023

(87) PCT Pub. No.: WO2022/085704
PCT Pub. Date: Apr. 28, 2022

(65) Prior Publication Data
US 2023/0349453 A1   Nov. 2, 2023

(30) Foreign Application Priority Data
Oct. 23, 2020   (JP) ................................. 2020-177691

(51) Int. Cl.
  *F16H 25/20*  (2006.01)
  *F16H 25/22*  (2006.01)
  *F16H 25/24*  (2006.01)
  *B60T 13/74*  (2006.01)

(52) U.S. Cl.
  CPC ..... *F16H 25/2204* (2013.01); *F16H 25/2015* (2013.01); *F16H 25/24* (2013.01); *B60T 13/745* (2013.01); *F16H 2025/2081* (2013.01)

(58) Field of Classification Search
CPC .. F16H 25/24; F16H 25/2021; F16H 25/2015; B60T 13/745
See application file for complete search history.

(56) References Cited

U.S. PATENT DOCUMENTS

| 10,421,446 B2* | 9/2019 | Schaefer ............... F16D 55/226 |
| 10,919,510 B2* | 2/2021 | Alili ...................... B60T 13/745 |
| 11,285,931 B2* | 3/2022 | Lee .......................... B60T 13/66 |
| 2017/0261053 A1 | 9/2017 | Schaefer et al. |

FOREIGN PATENT DOCUMENTS

| DE | 102008014995 A1 * | 9/2009 | ............. B60T 11/04 |
| JP | 10-78100 A | 3/1998 | |
| JP | 2016-014437 A | 1/2016 | |
| JP | 2019-513206 A | 5/2019 | |
| JP | 2019-113168 A | 7/2019 | |
| JP | 2020-143693 A | 9/2020 | |
| WO | WO-2018015087 A1 * | 1/2018 | ............ B60T 13/745 |

OTHER PUBLICATIONS

International Search report of PCT/JP2021/038690 dated Dec. 28, 2021 [PCT/ISA/210].

* cited by examiner

*Primary Examiner* — Gregory Robert Weber
(74) *Attorney, Agent, or Firm* — Sughrue Mion, PLLC

(57) ABSTRACT

A linear motion actuator has a ball screw device having a screw shaft, a nut, and a plurality of balls, a piston mounted on one end of the screw shaft, and a stroke limiting mechanism setting an operation starting point in time of the screw shaft toward a first direction pointed by the one end. The nut has one end face directed to the first direction and a protruding part protruding from the one end face.

10 Claims, 11 Drawing Sheets

LINEAR MOTION ACTUATOR

CROSS REFERENCE TO RELATED APPLICATIONS

This application is a National Stage of International Application No. PCT/JP2021/038690 filed on Oct. 20, 2021, claiming priority based on Japanese Patent Application No. 2020-177691 filed on Oct. 23, 2020.

FIELD

The present invention relates to a linear motion actuator including a ball screw device.

BACKGROUND

A linear motion actuator is a device including a ball screw device converting rotational motion into linear motion. In the linear motion actuator, when a nut rotates, the amount of protrusion of a screw shaft protruding from the nut changes. With this mechanism, an object mounted on an end of the screw shaft undergoes displacement in an axial direction. Examples of the object mounted on the end of the screw shaft include a piston. Such a linear motion actuator is used for brake boosters as shown in Patent Literature 1, for example.

As shown in Patent Literature 2, the linear motion actuator includes a stroke limiting mechanism. With this stroke limiting mechanism, the movement starting point in time (operation starting point in time) of the screw shaft can be made constant.

In detail, the stroke limiting mechanism of Patent Literature 2 is provided with a protruding part on an end face of the nut. A rotation prevention member is mounted on the end of the screw shaft. The rotation prevention member has a locking part protruding radially outward from the end of the screw shaft. When the amount of protrusion of the screw shaft becomes smaller due to the rotation of the nut, the rotation prevention member approaches the nut, and the locking part makes contact with the protruding part. With this contact, the rotation of the nut is restricted, and the position of the screw shaft in the axial direction is positioned.

CITATION LIST

Patent Literature

Patent Literature 1: Japanese Patent Application Laid-open No. 2016-014437
Patent Literature 2: Japanese Patent Application Laid-open No. 2019-113168

SUMMARY

Technical Problem

In the stroke limiting mechanism of Patent Literature 2, the rotation prevention member is a separate body from the screw shaft. In addition, the rotation prevention member is mounted on the screw shaft, and thus weight is an obstacle when improving the operability of the linear motion actuator. In addition, the rotation prevention member is mounted on the end of the screw shaft, and thus space for placing the screw shaft and the rotation prevention member is required.

The present invention has been made in view of the above problems, and an object thereof is to provide a linear motion actuator that can achieve parts count reduction, weight reduction, and size reduction.

Solution to Problem

To achieve the above object, a linear motion actuator according to an embodiment of the present invention comprising: a ball screw device having a screw shaft, a nut, and a plurality of balls; a piston mounted on one end of the screw shaft; and a stroke limiting mechanism setting an operation starting point in time of the screw shaft toward a first direction pointed by the one end, the nut having: one end face directed to the first direction; and a protruding part protruding from the one end face, the piston having: an opposite face directed to a second direction, which is opposite to the first direction, and opposite the one end face; a clearance groove part recessed from the opposite face in the first direction and extending in a rotational direction about the screw shaft; and a stepped face placed on an end of the clearance groove part in one of the rotational direction out of wall faces surrounding the clearance groove part and directed to another of the rotational direction, and the protruding part and the stepped face are in contact with each other to form the stroke limiting mechanism.

According to the present invention, the piston is provided with the stepped face instead of a rotation prevention member. Thus, the parts count is reduced. In addition, the screw shaft achieves weight reduction compared to conventional ones, thereby improving the operability of the linear motion actuator. In addition, not having the rotation prevention member, the linear motion actuator can achieve size reduction. The load input to the stepped face due to contact with the protruding part is dispersed to the piston. Thus, stress is inhibited from being concentrated on the part in which the stepped face is provided.

As a desirable embodiment of the linear motion actuator, the piston has a bottom face surrounding the clearance groove part from the first direction out of the wall faces surrounding the clearance groove part, and at least part of the bottom face is inclined to be positioned in the first direction as the at least part of the bottom face is directed to the one of the rotational direction to be spiral.

According to the above configuration, the recessed amount of the clearance groove part can be reduced compared to a case in which the recessed amount of the clearance groove part is constant in the circumferential direction. In other words, the volume of the piston is inhibited from being reduced. With this effect, the load having been input to the stepped face is easily dispersed, and stress concentration is inhibited.

As a desirable embodiment of the linear motion actuator, the piston has a bottom face surrounding the clearance groove part from the first direction out of the wall faces surrounding the clearance groove part, and at least part of the bottom face is positioned in the first direction in stages as the at least part of the bottom face is directed to the one of the rotational direction to be staircase-shaped.

According to the above configuration, the recessed amount of the clearance groove part can be reduced compared to a case in which the recessed amount of the clearance groove part is constant in the circumferential direction. In other words, the volume of the piston is inhibited from being reduced. With this effect, the load having been input to the stepped face is easily dispersed, and stress concentration is inhibited.

As a desirable embodiment of the linear motion actuator, the piston has a bottom face surrounding the clearance groove part from the first direction out of the wall faces surrounding the clearance groove part, and at least part of the bottom face is a flat face.

As a desirable embodiment of the linear motion actuator, the piston has a stopper having a face directed to the other of the rotational direction as the stepped face.

As a desirable embodiment of the linear motion actuator, the piston has an inner tube part positioned on a radial inside of the stopper and opening in the second direction provided with a fitting hole into which the one end of the screw shaft is fit, and a radial inside end of the stopper is connected to the inner tube part.

According to the above configuration, the load acting on the stopper is dispersed to the inner tube part. Thus, stress concentration on the stopper is inhibited.

As a desirable embodiment of the linear motion actuator, the piston has an outer tube part positioned on a radial outside of the stopper and having an outer circumferential face sliding with a housing, and a radial outside end of the stopper is connected to the outer tube part.

According to the above configuration, the load acting on the stopper is dispersed to the outer tube part. Thus, stress concentration on the stopper is inhibited.

As a desirable embodiment of the linear motion actuator, the piston has a first end face directed to the first direction, the first end face is provided with a protruding streak protruding in the first direction at a position overlapping the clearance groove part when viewed from an axial direction parallel to the screw shaft, and an amount of protrusion of the protruding streak corresponds to a recessed amount of the clearance groove part.

According to the above configuration, the thickness of the part in which the clearance groove part is formed in the axial direction can be made even. The stepped face and the stopper are covered by the outer tube part, and thus the stepped face and the stopper cannot be visually recognized when assembled to the screw shaft. Thus, it is difficult to determine the phase of the stepped face and the stopper when assembling the screw shaft. However, the phase of the stepped face and the stopper can be grasped from the shape of the protruding streak. Thus, when assembling the screw shaft, phase determination of the stepped face and the stopper is made easy.

As a desirable embodiment of the linear motion actuator, the protruding part has a contact face being in contact with the stepped face, the stepped face is parallel to a first imaginary line extending in a radial direction and is placed on the other of the rotational direction when viewed from an axial direction parallel to the screw shaft, the contact face is parallel to a second imaginary line extending in the radial direction and is placed on the other of the rotational direction when viewed from the axial direction, and a distance between the stepped face and the first imaginary line is larger than a distance between the contact face and the second imaginary line.

According to the above configuration, the stepped face and the contact face are in contact with each other through the radially inside parts. Thus, it is difficult for a load to act on the radially outside parts of the stepped face and the contact face.

As a desirable embodiment of the linear motion actuator, the nut is made of an iron-based material, and the piston is made of an aluminum alloy.

According to the above configuration, the stepped face (the piston) is more easily plastically deformed when the protruding part and the stepped face make contact with each other.

Advantageous Effects of Invention

The linear motion actuator of the present invention can achieve parts count reduction, weight reduction, and size reduction.

DESCRIPTION OF EMBODIMENTS

The following describes the present invention in detail with reference to the accompanying drawings. The present invention is not limited by the following modes for performing the invention (hereinafter referred to as "embodiments"). The components in the following embodiments include ones that can be readily assumed by those skilled in the art, substantially the identical ones, and ones in what is called equivalents. Furthermore, the components disclosed in the following embodiments can be combined with each other as appropriate.

Figure 1:
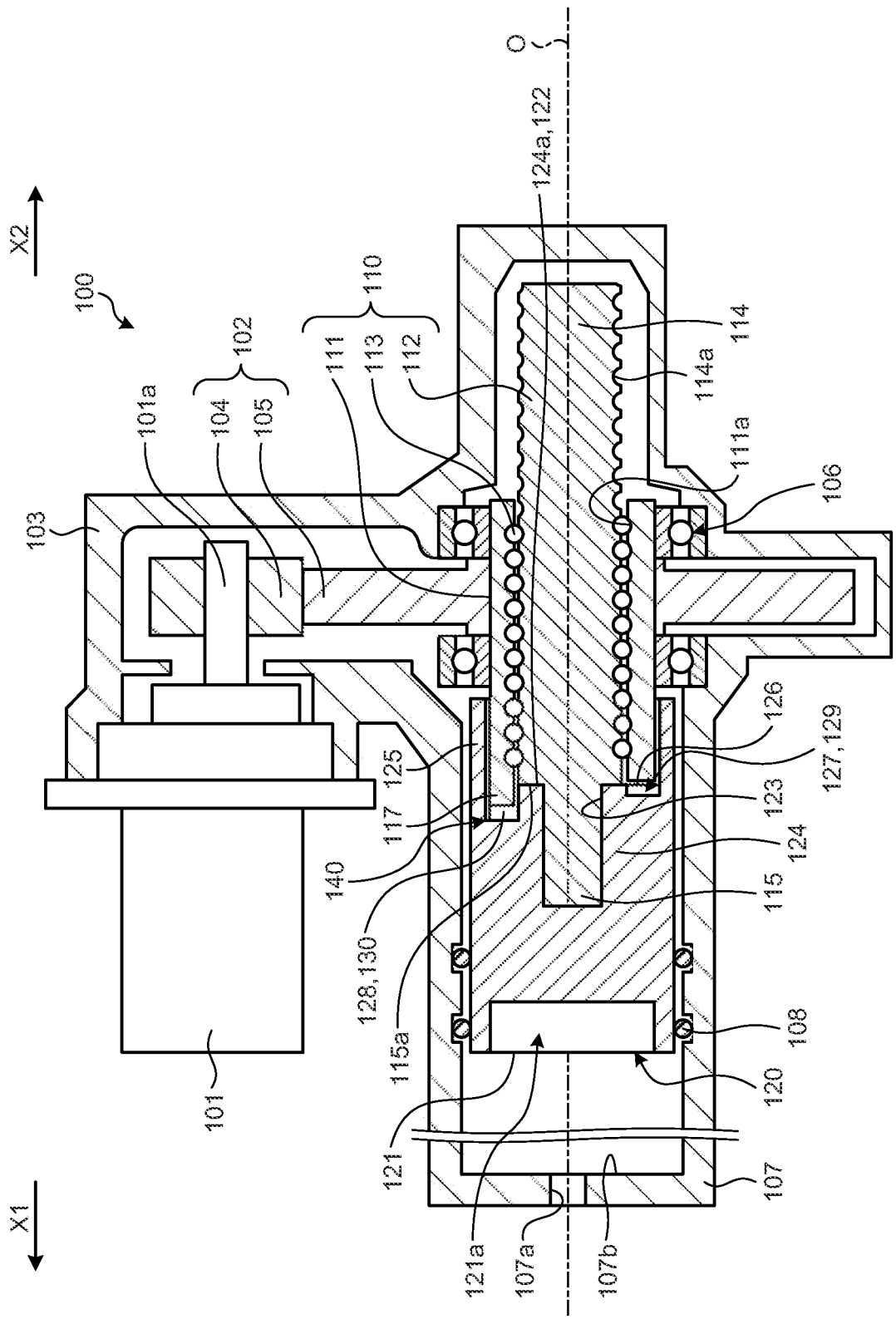
FIG. 1 is a sectional view of a linear motion actuator of a first embodiment cut in an axial direction.

FIG. 1 is a sectional view of a linear motion actuator of a first embodiment cut in an axial direction.

Figure 2:
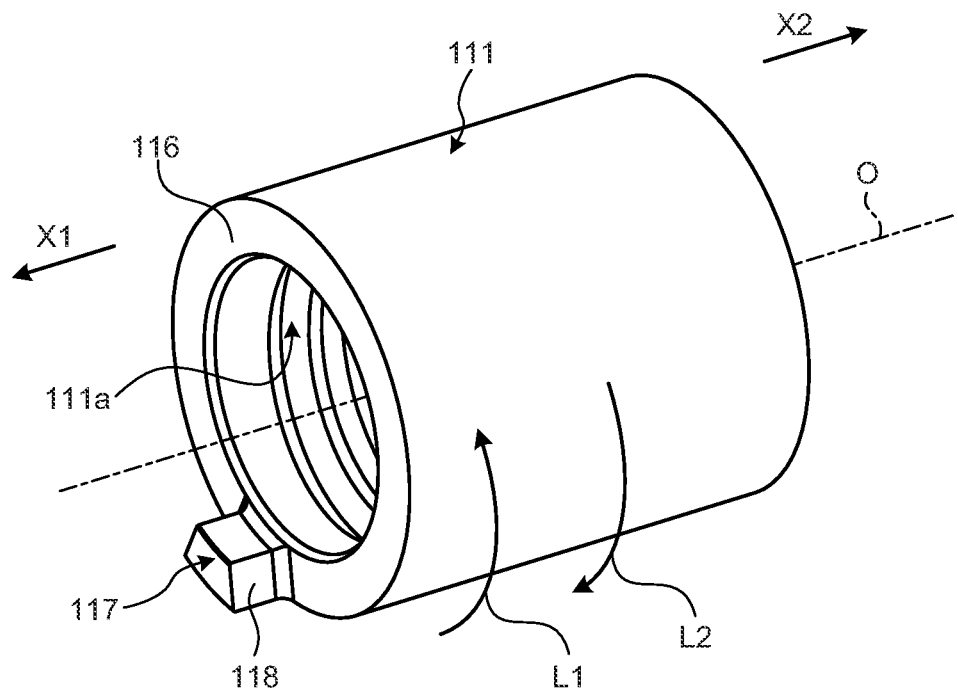
FIG. 2 is a perspective view of a nut of the first embodiment perspectively viewed from a first direction.

FIG. 2 is a perspective view of a nut of the first embodiment perspectively viewed from a first direction.

Figure 3:
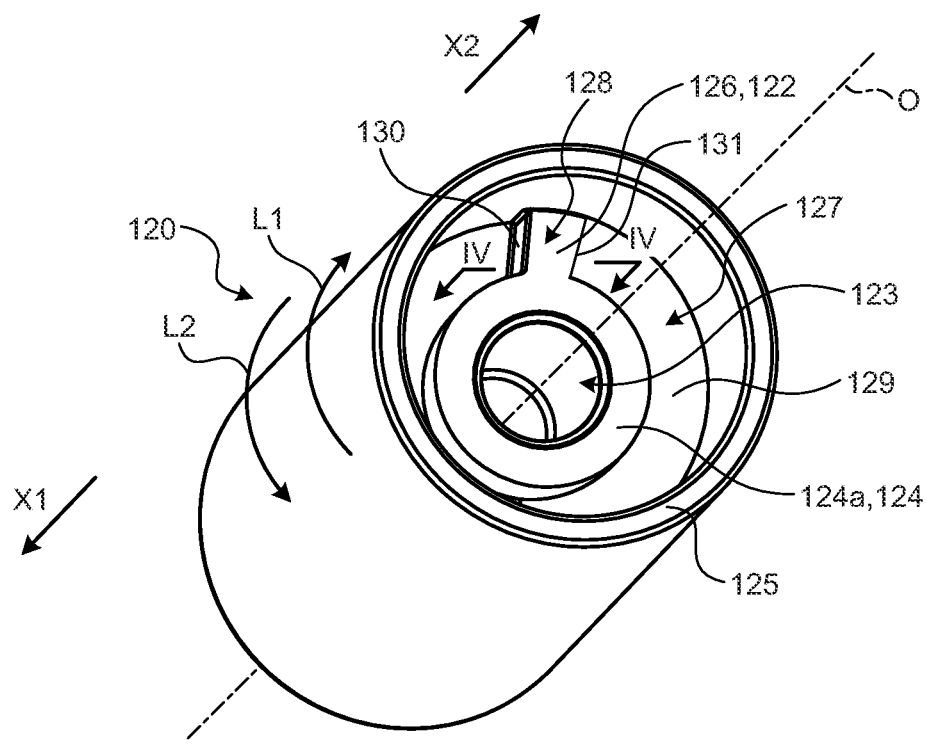
FIG. 3 is a perspective view of a piston of the first embodiment perspectively viewed from a second direction.

FIG. 3 is a perspective view of a piston of the first embodiment perspectively viewed from a second direction.

Figure 4:
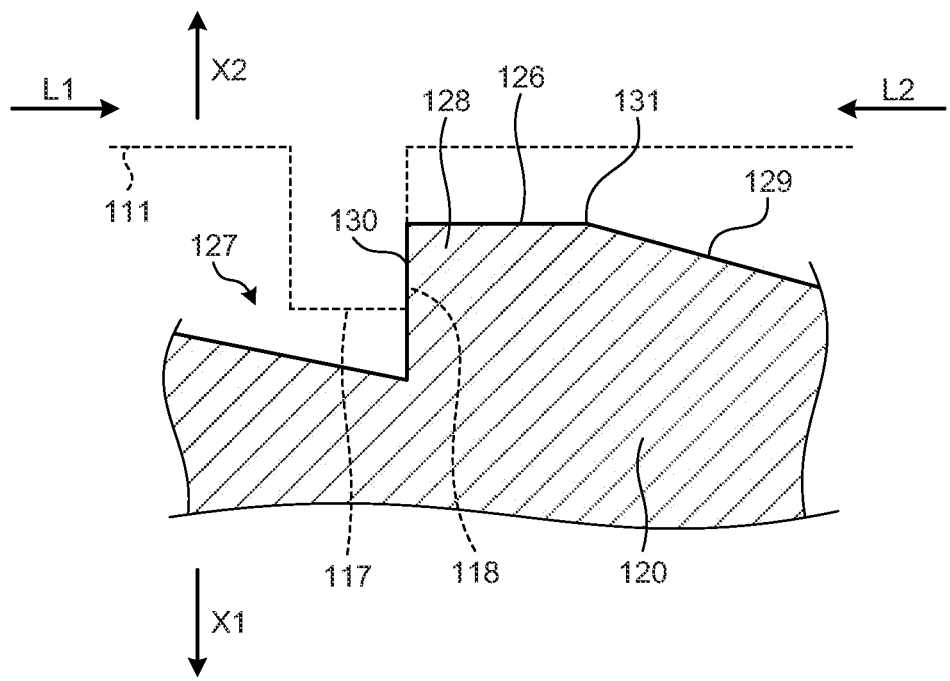
FIG. 4 is a IV-IV arrow sectional view of FIG. 3.

FIG. 4 is a IV-IV arrow sectional view of FIG. 3.

First Embodiment

A linear motion actuator 100 of the first embodiment is a brake booster mounted on a vehicle and generating hydraulic pressure corresponding to the amount of depression of a brake pedal. As illustrated in FIG. 1, the linear motion actuator 100 includes a motor 101, a transmission device 102, a housing 103, a ball screw device 110, a piston 120, and a stroke limiting mechanism 140.

In the following, the direction parallel to an axis O of a screw shaft 112 of the ball screw device 110 is referred to as an axial direction. In the axial direction, the direction in which the piston 120 is placed when viewed from a nut 111 of the ball screw device 110 is referred to as a first direction X1, whereas the direction opposite to the first direction X1 is referred to as a second direction X2.

The motor 101 includes a stator (not illustrated), a rotor (not illustrated), and an output shaft 101a. In the motor 101, power is supplied from a power source (not illustrated) to rotate the rotor and the output shaft 101a. The motor 101 is supported by the housing 103, with the output shaft 101a parallel to the screw shaft 112.

The transmission device 102 includes a first gear 104 fit into the output shaft 101a of the motor 101 and a second gear 105 fit onto the outer circumferential side of the nut 111. The second gear 105 is a gear with a larger diameter than the first gear 104. Thus, the transmission device 102 reduces the rotational motion generated by the motor 101 and transmits it to the nut 111.

The ball screw device 110 includes the nut 111, the screw shaft 112, and a plurality of balls 113. The nut 111 is formed in a cylindrical shape about the axis O. An inner circumferential face of the nut 111 is provided with an inner raceway 111a. The nut 111 is supported by bearings 106 fit into an inner circumferential face of the housing 103. With this structure, the nut 111 is free to rotate about the axis O of the screw shaft 112.

The following description regarding the rotational direction of the nut 111 is based on the case viewed from the first direction X1. As illustrated in FIG. 2, the counterclockwise rotational direction about the axis O when viewed from the first direction X1 is referred to as a first rotational direction L1. The clockwise rotational direction about the axis O is referred to as a second rotational direction L2.

As illustrated in FIG. 2, the nut 111 has one end face 116 directed to the first direction X1. The one end face 116 is provided with a protruding part 117 protruding in the first direction X1. The protruding part 117 is substantially trapezoidal when viewed from the axial direction. The protruding part 117 has a contact face 118 directed to the first rotational direction L1.

As illustrated in FIG. 1, the screw shaft 112 is a solid shaft component passing through the nut 111. The screw shaft 112 includes a screw shaft main body 114 provided with an outer raceway 114a on its outer circumferential face and a mounting part 115 extending in the first direction X1 from an end face of the screw shaft main body 114 in the first direction X1. Although not specifically illustrated, the screw shaft main body 114 is supported by the housing 103 in a movable manner in the axial direction and in a non-rotatable manner about the axis O.

The inner raceway 111a and the outer raceway 114a form a spiral track therebetween. The ball 113 are placed in this spiral track. When the nut 111 rotates, the inner raceway 11a pushes the outer raceway 114a in the axial direction via the balls 113. With this pushing, the screw shaft 112 moves in the axial direction. In the present embodiment, when the nut 111 rotates in the second rotational direction L2, the screw shaft 112 moves in the first direction X1. On the other hand, when the nut 111 rotates in the first rotational direction L1, the screw shaft 112 moves in the second direction X2.

The mounting part 115 has a smaller diameter than the screw shaft main body 114. Thus, an annular stepped face 115a directed to the first direction X1 is provided at the boundary between the mounting part 115 and the screw shaft main body 114.

The piston 120 is a cylindrical component placed coaxially with the axis O. Although the piston 120 is preferably manufactured by forging, it may be formed by known methods of machining such as cutting. The piston 120 is placed inside a cylinder 107, closer to the end in the second direction X2. Although the cylinder 107 of the present embodiment is provided integrally with the housing 103, the cylinder 107 and the housing 103 may be separate from each other in the present disclosure. Inside the cylinder 107 is brake fluid, not illustrated. The piston 120 includes a first end face 121 directed to the first direction X1 and a second end face 122 directed to the second direction X2.

The first end face 121 is provided with a concave face 121a recessed in the second direction X2. The concave face 121a is opposite a bottom face 107b of the cylinder 107. A coil spring, not illustrated, is placed between the concave face 121a and the bottom face 107b. When the piston 120 is pushed in the first direction X1, the piston 120 moves against the coil spring, not illustrated. Note that the piston of the present disclosure is not necessarily provided with the concave face 121a.

As illustrated in FIG. 3, the central part of the second end face 122 is provided with a fitting hole 123 opening in the second direction X2. The mounting part 115 (one end of the screw shaft 112) is inserted into the fitting hole 123 (refer to FIG. 1). The inner diameter of the fitting hole 123 is slightly smaller than the outer diameter of the mounting part 115, providing a tightening allowance. Thus, the piston 120, without separating from the screw shaft 112, moves in the axial direction integrally with the screw shaft 112.

In the following, the part of the piston 120 fit onto the mounting part 115 (the tubular wall part surrounding the outer circumferential side of the fitting hole 123) is referred to as an inner tube part 124. As illustrated in FIG. 1, an end face 124a of the inner tube part 124 in the second direction X2 is in contact with the annular stepped face 115a of the screw shaft 112.

As illustrated in FIG. 1, an outer circumferential face of the piston 120 is in sliding contact with a seal member 108 on the inner circumferential side of the cylinder 107. With this structure, the brake fluid, not illustrated, is sealed in so as not to flow toward the nut 111 and the screw shaft 112.

The outer diameter of the piston 120 is larger than the outer diameter of the nut 111. The second end face 122 of the piston 120 is provided with an annular outer tube part 125 protruding in the second direction X2 to surround the outer circumferential side of the nut 111. In other words, the outer circumferential face of the piston 120 is expanded in the second direction X2 by the outer tube part 125. Thus, even when the piston 120 moves in the first direction X1, the outer tube part 125 and the seal member 108 make sliding contact with each other to maintain sealability.

Part of the second end face 122 of the piston 120 forms an opposite face 126 opposite the one end face 116 of the nut 111. The opposite face 126 is positioned on the radial outside of the inner tube part 124 and on the radial inside of the outer tube part 125.

As illustrated in FIG. 3, part of the opposite face 126 is provided with a clearance groove part 127 recessed in the first direction X1. The clearance groove part 127 extends in the rotational direction about the axis O and is arc-shaped (C-shaped) when viewed from the axial direction. This clearance groove part 127 is a space for avoiding contact with the protruding part 117 of the nut 111. In the following, the wall face surrounding the clearance groove part 127 from the first direction X1 out of wall faces surrounding the clearance groove part 127 is referred to as a bottom face 129.

As illustrated in FIG. 3 and FIG. 4, the recessed amount (depth) of the clearance groove part 127 gradually increases from the opposite face 126 toward the first rotational direction L1. Thus, the bottom face 129 of the clearance groove part 127 is a spiral-shaped spiral face, which is positioned in the first direction X1 as it is directed to the first rotational direction L1. The end of the clearance groove part 127 in the first rotational direction L1 is provided with a stepped face 130 with respect to the opposite face 126 and the bottom face 129. On the other hand, the end of the clearance groove part 127 in the second rotational direction L2 is provided with a ridgeline 131 as a boundary line between the opposite face 126 and the bottom face 129.

The clearance groove part 127 is a space for avoiding contact with the protruding part 117 as described above. Thus, the inclination angle of the bottom face 129 of the clearance groove part 127 is set to be same as the inclination angle of the inner raceway 111a (refer to FIG. 1) or set to be larger than the inclination angle of the inner raceway 111a.

The part out of the opposite face 126 not provided with the clearance groove part 127 is a stopper 128. The side face of the stopper 128 in the second rotational direction L2 is the stepped face 130. The stopper 128 is substantially trapezoidal when viewed from the axial direction. As illustrated in FIG. 3, the radially inside end of the stopper 128 is connected to the inner tube part 124. The radially outside end of the stopper 128 is connected to the outer tube part 125.

The following describes the operation of the linear motion actuator 100 of the first embodiment. When the motor 101 is driven, rotational motion is transmitted to the nut 111 via the transmission device 102. With this transmission, the nut 111 rotates. When the rotational direction of the nut 111 is the second rotational direction L2, the screw shaft 112 moves in the first direction X1. Along with this movement, the piston 120 also moves in the first direction X1, increasing the hydraulic pressure of the brake fluid. Consequently, the hydraulic pressure of the brake fluid is transmitted to an external device through a through hole 107a.

On the other hand, when the nut 111 rotates in the first rotational direction L1, the screw shaft 112 moves in the second direction X2. Along with this movement, the piston 120 moves in the second direction X2, decreasing the hydraulic pressure of the brake fluid. The distance between the second end face 122 of the piston 120 and the one end face 116 of the nut 111 gradually decreases. The protruding part 117 of the nut 111 enters the clearance groove part 127 of the piston 120 while rotating in the first rotational direction L1.

After entering the clearance groove part 127, the protruding part 117 further rotates in the first rotational direction L1 to make contact with the stepped face 130 of the stopper 128. With this contact, the rotation of the nut 111 in the first rotational direction L1 stops. After the stop of the rotation of the nut 111, the contact face 118 of the nut 111 and the stepped face 130 of the piston 120 are in contact with each other (refer to FIG. 4), and thus the nut 111 is restricted from rotating in the first rotational direction L1. With this restriction, the screw shaft 112 is also restricted from moving in the second direction X2. From the above, when the linear motion actuator 100 is operated next time, it starts from the state in which the protruding part 117 and the stepped face 130 are in contact with each other. In this way, the movement starting point in time (the operation starting point in time) of the screw shaft 112 in the axial direction is made constant. In other words, the protruding part 117 (the contact face) and the stopper 128 (the stepped face 130) form the stroke limiting mechanism 140.

When the protruding part 117 makes contact with the stepped face 130, a load is input from the protruding part 117 to the stopper 128. The stopper 128 is formed integrally with the piston 120, and thus the load is dispersed to the piston 120. The stopper 128 is continuous with the inner tube part 124 and the outer tube part 125, and the load is easily dispersed to the inner tube part 124 and the outer tube part 125. Thus, the load having been input to the stopper 128 is dispersed to the parts, and stress is not concentrated on the stopper 128.

As described above, the linear motion actuator 100 of the first embodiment has the ball screw device 110 having the screw shaft 112, the nut 111, and the balls 113, the piston 120 mounted on the one end of the screw shaft 112, and the stroke limiting mechanism 140 setting the operation starting point in time of the screw shaft 112 toward the first direction X1 pointed by the one end. The nut 111 has the one end face 116 directed to the first direction X1 and the protruding part 117 protruding from the one end face 116. The piston 120 has the opposite face 126 directed to the second direction X2, which is opposite to the first direction X1, and opposite the one end face 116, the clearance groove part 127 recessed from the opposite face 126 in the first direction X1 and extending in the rotational direction about the screw shaft 112, and the stepped face 130 placed on an end of the clearance groove part 127 in one of the rotational direction (the second rotational direction L2) out of the wall faces surrounding the clearance groove part 127 and directed to the other of the rotational direction (the first rotational direction L1). The protruding part 117 and the stepped face 130 are in contact with each other to form the stroke limiting mechanism 140.

According to the linear motion actuator 100 of the first embodiment, the rotation prevention member is not required. Thus, the parts count is reduced, and the man-hours for assembly work are reduced. In addition, the screw shaft 112 is reduced in weight, improving the operability of the linear motion actuator 100. Furthermore, the linear motion actuator 100 can also be reduced in size.

The piston 120 of the first embodiment has the stopper 128 the face directed to the other of the rotational direction (the first rotational direction L1) of which is the stepped face 130, the inner tube part 124 positioned on the radial inside of the stopper 128 and provided with the fitting hole 123 opening in the second direction X2 into which the one end of the screw shaft 112 is fit, and the outer tube part 125 positioned on the radial outside of the stopper 128 and having an outer circumferential face sliding with the housing 103. The radially inside end of the stopper 128 is connected to the inner tube part 124. The radially outside end of the stopper 128 is connected to the outer tube part 125.

According to the linear motion actuator 100 of the first embodiment, the load having been input to the stopper 128 is dispersed to the inner tube part 124 and the outer tube part 125. Thus, stress is not concentrated on the stopper 128.

The linear motion actuator 100 of the first embodiment has been described. The present disclosure is not limited to the examples described in the embodiment. Although the piston 120 of the first embodiment has the inner tube part 124 and the outer tube part 125, for example, the present disclosure may be a piston including only an inner tube part, a piston including only an outer tube part, or a piston including neither an inner tube part nor an outer tube part. The shape of the clearance groove part of the piston is not limited to the example shown in the embodiment, either. The following describes modifications in which the clearance groove part is varied in shape. In the modifications, the piston does not have the outer tube part in order to make the shape of the clearance groove part easier to see.

First Modification

Figure 5:
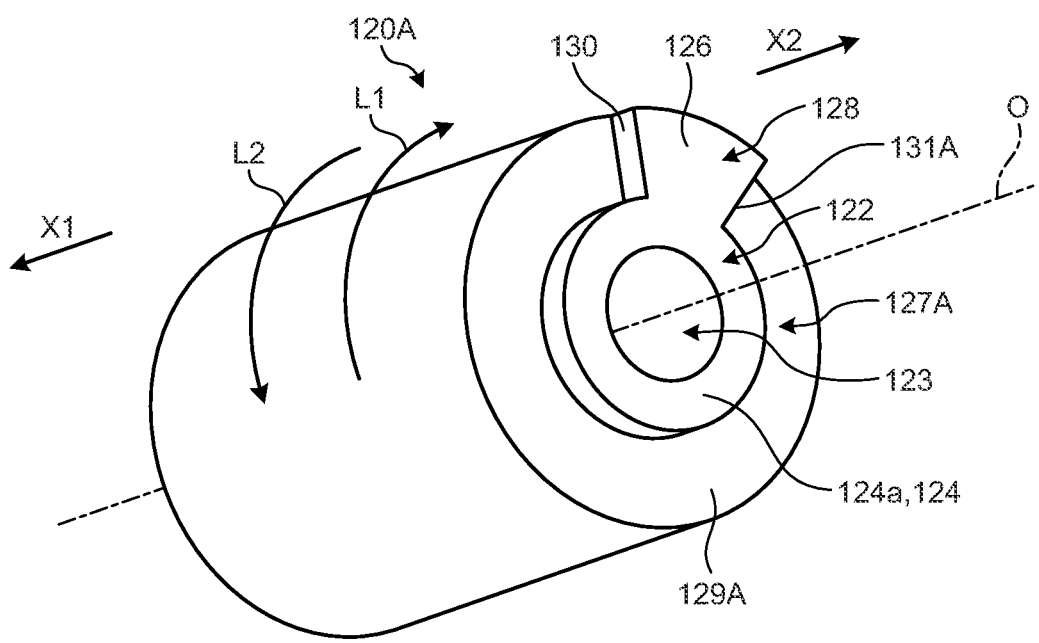
FIG. 5 is a perspective view of a piston of a first modification perspectively viewed from the second direction.

FIG. 5 is a perspective view of a piston of a first modification perspectively viewed from the second direction. In a piston 120A of the first modification, the recessed amount of a clearance groove part 127A is constant in the circumferential direction. In other words, a bottom face 129A of the clearance groove part 127A is a flat face flat toward the rotational direction. Also in this first modification, as in the first embodiment, the rotation prevention member is not required, achieving parts count reduction and the size reduction of the linear motion actuator.

The end of the clearance groove part 127A in the second rotational direction L2 is a stepped face 131A between the bottom face 129A and the opposite face 126. According to the first modification, the recessed amount of the clearance groove part 127A is larger than that of the clearance groove part 127 of the first embodiment. In other words, the piston 120 of the first embodiment is larger than the volume of the piston 120A of the first modification. Thus, from the viewpoint of inhibiting stress concentration, the shape of the clearance groove part 127 of the first embodiment is more desirable.

Second Modification

Figure 6:
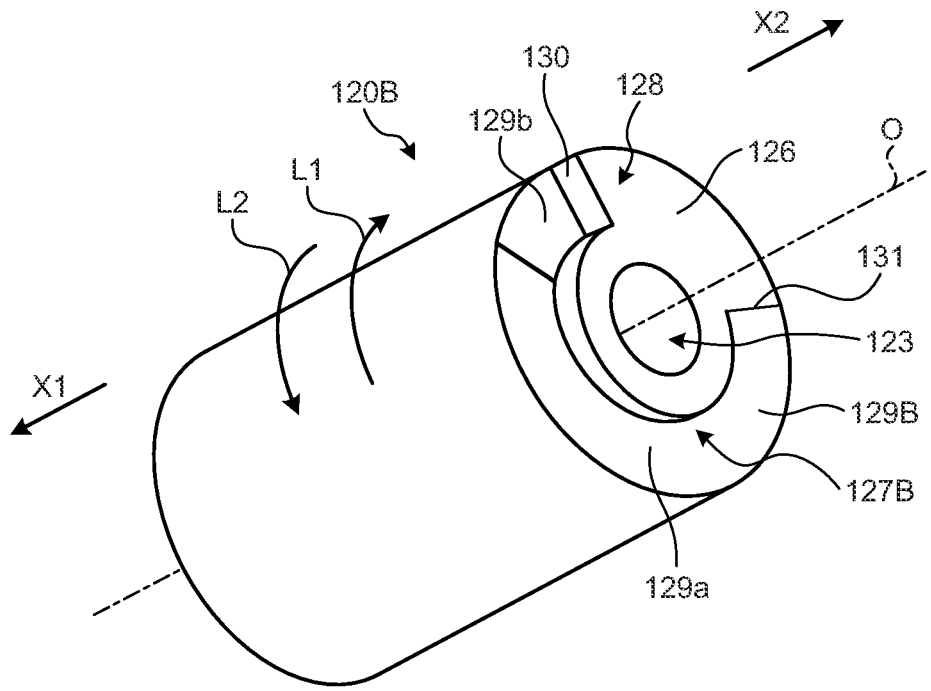
FIG. 6 is a perspective view of a piston of a second modification perspectively viewed from the second direction.

FIG. 6 is a perspective view of a piston of a second modification perspectively viewed from the second direction. As illustrated in FIG. 6, in a piston 120B of the second modification, a bottom face 129B of a clearance groove part 127B has a spiral-shaped spiral face 129a and a flat-shaped flat face 129b. In other words, the spiral face 129a extends from the ridgeline 131 in the first rotational direction L1, and the flat face 129b extends from the end of the spiral face 129a in the first rotational direction L1 in the first rotational direction L1. Also with the thus configured second modification, the same effects as those of the first embodiment can be obtained. In other words, the bottom face of the present disclosure may be a combination of two or more kinds of faces.

Third Modification

Figure 7:
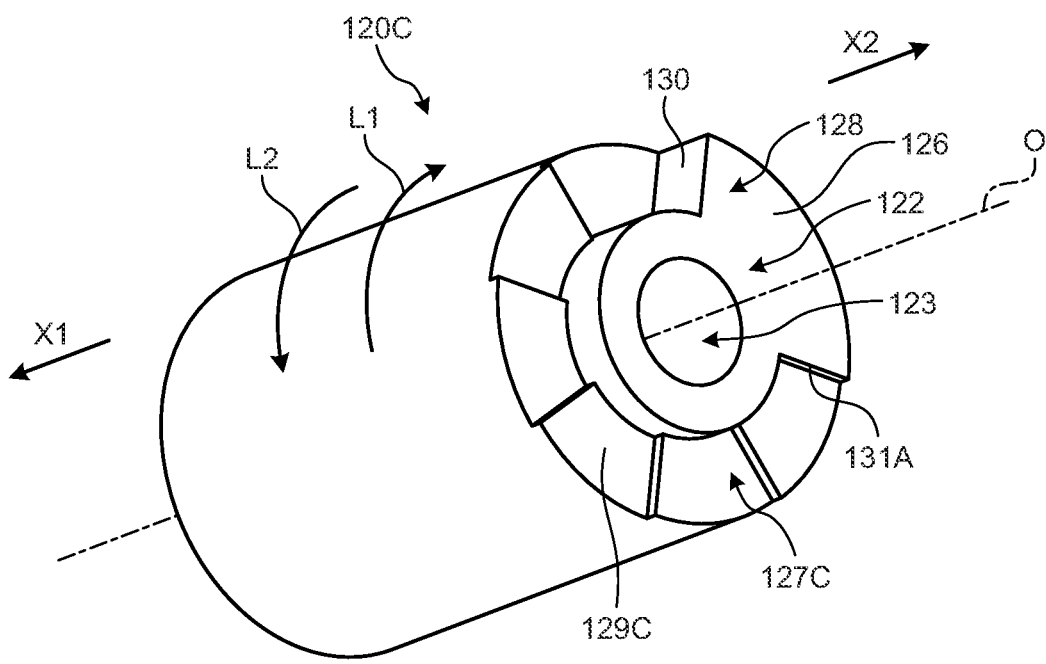
FIG. 7 is a perspective view of a piston of a third modification perspectively viewed from the second direction.

FIG. 7 is a perspective view of a piston of a third modification perspectively viewed from the second direction. As illustrated in FIG. 7, a clearance groove part 127C of a piston 120C of the third modification has a recessed amount (depth) from the opposite face 126 increasing in stages toward the first rotational direction L1. In other words, a bottom face 129C of the clearance groove part 127C is a staircase-shaped staircase face positioned in the first direction X1 in stages as it is directed toward the first rotational direction L1. Also with the thus configured third modification, the same effects as those of the first embodiment can be obtained.

The recessed amount of the clearance groove part 127C is substantially the same as that of the clearance groove part 127 of the first embodiment and the volume of the piston 120B is substantially equal to that of the piston 120 of the first embodiment. Thus, as in the first embodiment, this shape easily inhibits stress concentration. Besides, as to the manufacture of the piston 120C of the second modification, when the outer circumferential face of the piston 120C is cut (it is cut from the radial outside) to form the clearance groove part 127C, it is formed more easily than the spiral bottom face 129 of the first embodiment. Thus, the manufacture of the piston 120C can be reduced in cost.

Fourth Modification

Figure 8:
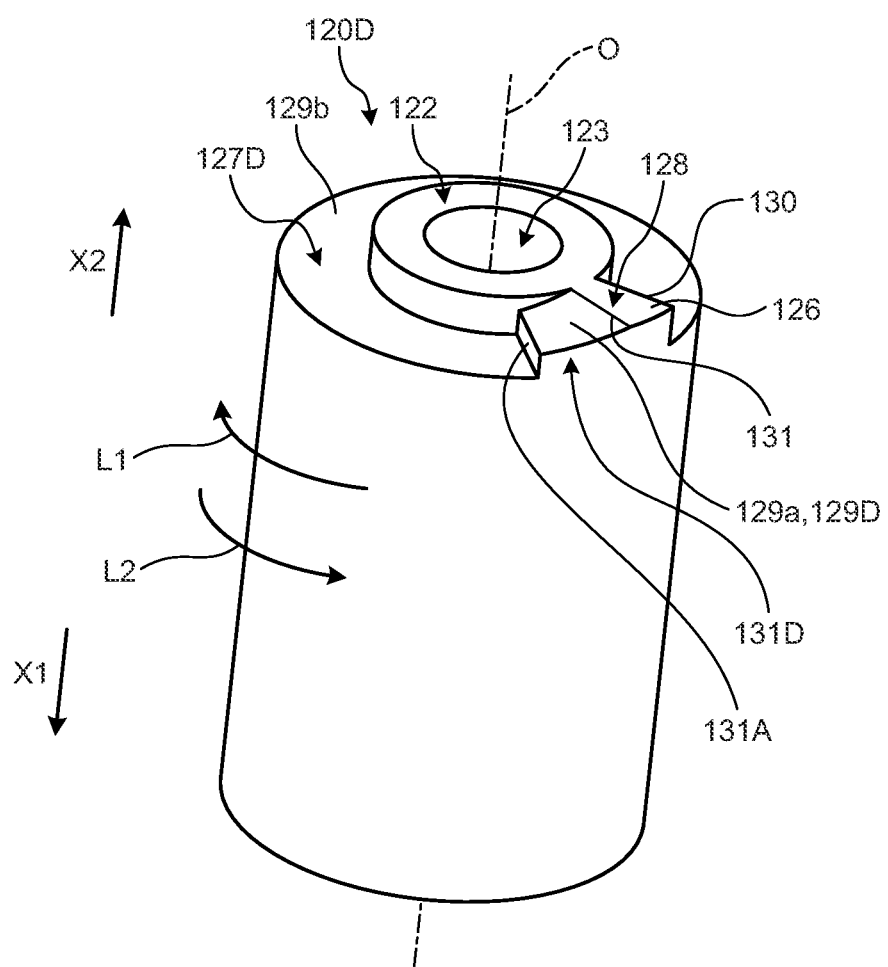
FIG. 8 is a perspective view of a piston of a fourth modification perspectively viewed from the second direction.

FIG. 8 is a perspective view of a piston of a fourth modification perspectively viewed from the second direction. As illustrated in FIG. 8, in a piston 120D of the fourth modification, a bottom face 129D of a clearance groove part 127D is a combination of a spiral face 129a, a stepped face 131A, and a flat face 129b. In other words, the recessed amount of the clearance groove part 127D significantly changes in the middle, forming the stepped face 131A. With this structure, a thick-walled reinforcing part 131D partially remains in the first rotational direction L1 of the stopper 128. Thus, the fourth modification achieves weight reduction compared to the piston 120 of the first embodiment, while its shape inhibits stress concentration compared to that of the piston 120A of the first modification.

The modifications about the clearance groove part (the bottom face) have been described. The following describes examples in which the shapes of the contact face and the stepped face are changed.

Fifth Modification

Figure 9:
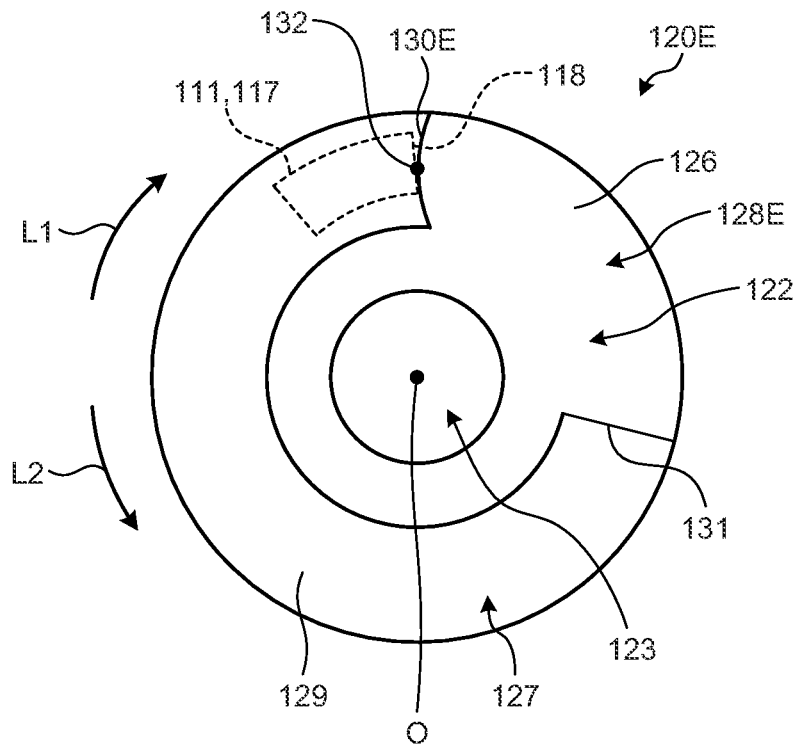
FIG. 9 is a plan view of a piston of a fifth modification viewed from the second direction.

FIG. 9 is a plan view of a piston of a fifth modification viewed from the second direction. As illustrated in FIG. 9, a stepped face 130E of a piston 120E of the fifth modification is arc-shaped when viewed from the second direction X2. In other words, a radial central part 132 of the stepped face 130E protrudes in the second rotational direction L2. Thus, when the protruding part 117 and a stopper 128E make contact with each other, the contact face 118 makes contact with the central part 132 of the stepped face 130E. When the contact is repeated, the central part 132 of the stepped face 130E gradually collapses, and the stepped face 130E becomes a flat face. From the above, according to the fifth modification, the stepped face 130E has a shape in which the contact part with the contact face 118 of the protruding part 117 gradually becomes larger. Also with the fifth modification, the same effects as those of the first embodiment can be obtained.

In the fifth modification, the nut 111 is preferably made of an iron-based material, and the piston 120E is preferably made of an aluminum alloy. With this configuration, when the protruding part 117 and the stepped face 130E make contact with each other, the stepped face 130E is more easily deformed. Thus, the flattening (plastic deformation) of the stepped face 130E can be accelerated. The use of the aluminum alloy also produces a damping effect (vibration absorption) when the contact face 118 of the protruding part 117 makes contact therewith. Thus, contact noise can be reduced.

Although the fifth modification shows the arc-shaped stepped face 130E as an example of the shape of the stepped face that is easily plastically deformed, the present disclosure is not limited to this example. For example, the stepped face may have large surface roughness, although it is substantially flat. With this example, the stepped face becomes less uneven on the surface (the surface roughness becomes smaller) through repeated contact with the protruding part 117.

Microscopic unevenness may be molded onto the stepped face 130E. With this structure, the unevenness is plastically deformed only when an excessive torque is input, allowing the contact faces to acclimate to each other to disperse stress.

Sixth Modification

Figure 10:
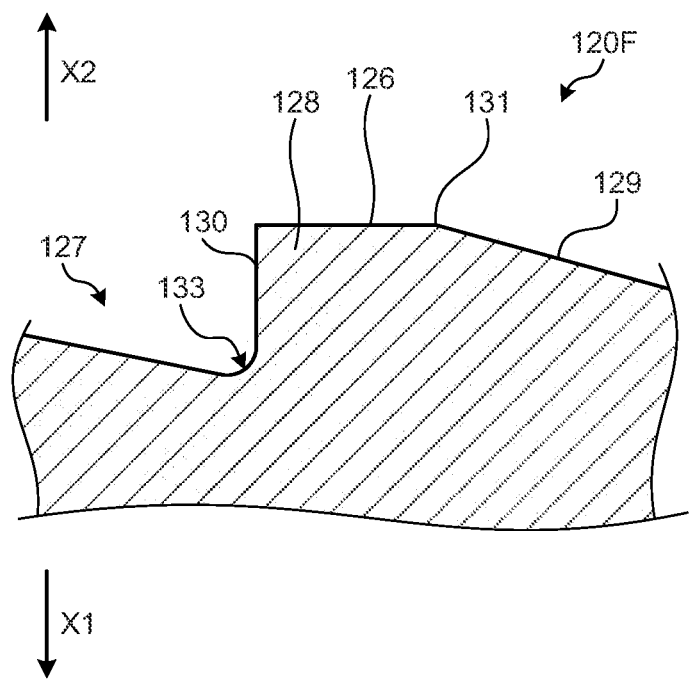
FIG. 10 is a sectional view of a piston of a sixth modification cut in the axial direction.

FIG. 10 is a sectional view of a piston of a sixth modification cut in the axial direction. As illustrated in FIG. 10, a piston 120F of the sixth modification has an R shape at a corner part 133 between the stepped face 130 and the bottom face 129. With this structure, the volume of the part of the corner part 133 increases, and stress concentration can be inhibited.

Seventh Modification

Figure 11:
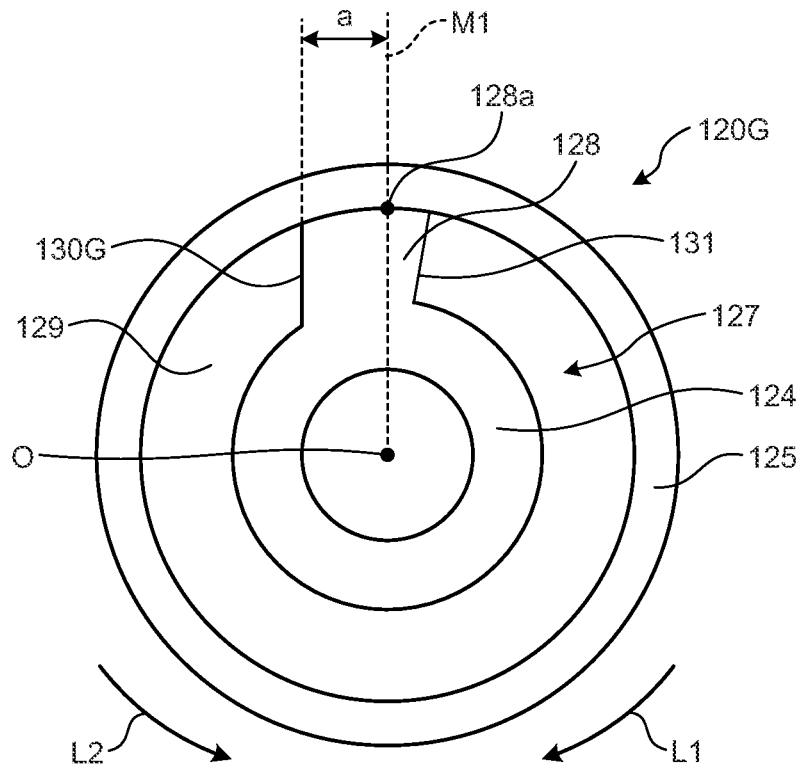
FIG. 11 is a plan view of a piston of a seventh modification viewed from the second direction.
Figure 12:
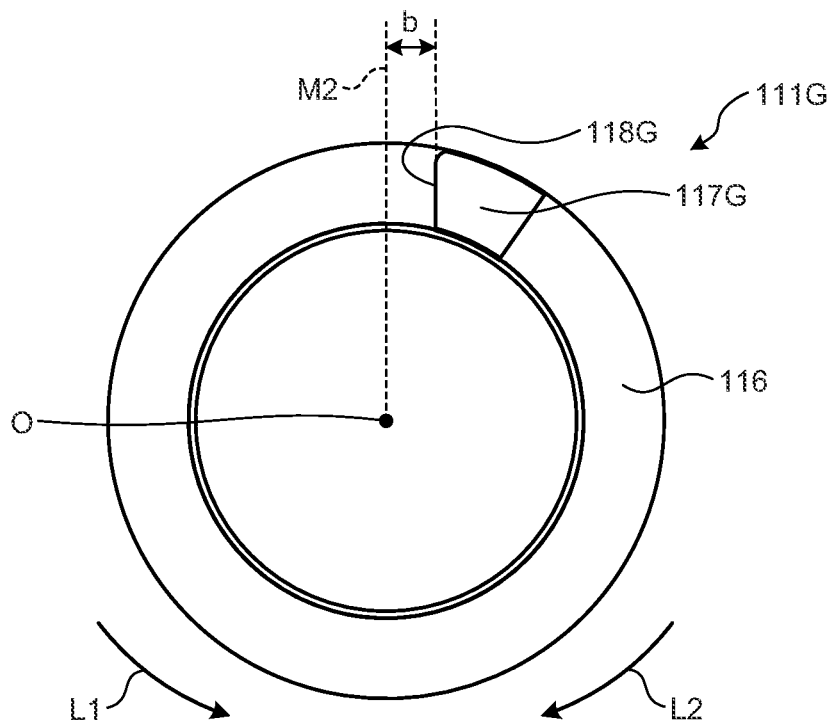
FIG. 12 is a plan view of a nut of the seventh modification viewed from the first direction.
Figure 13:
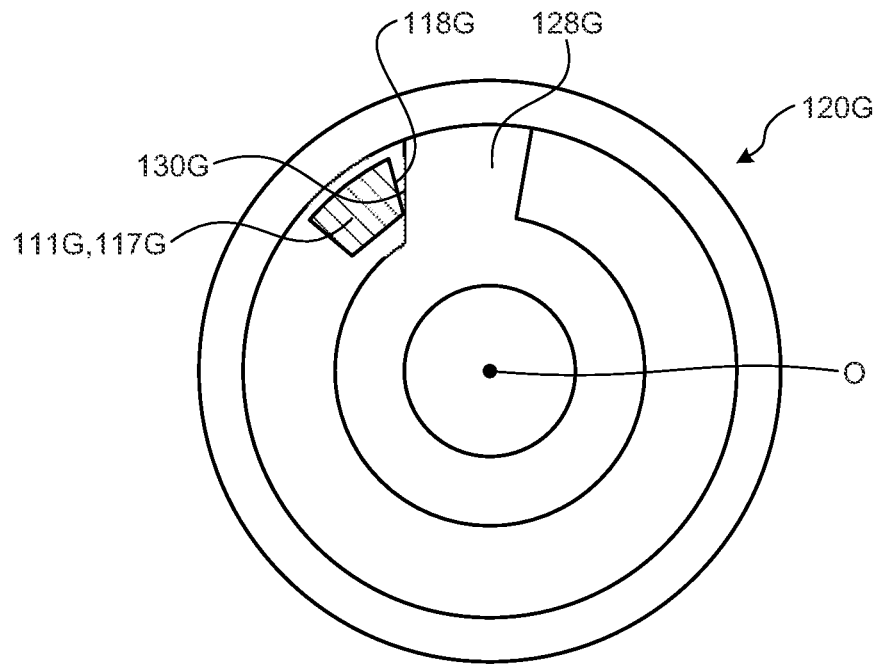
FIG. 13 is a sectional view illustrating a state in which a stopper and a protruding part are in contact with each other in a linear motion actuator of the seventh modification.
Figure 14:
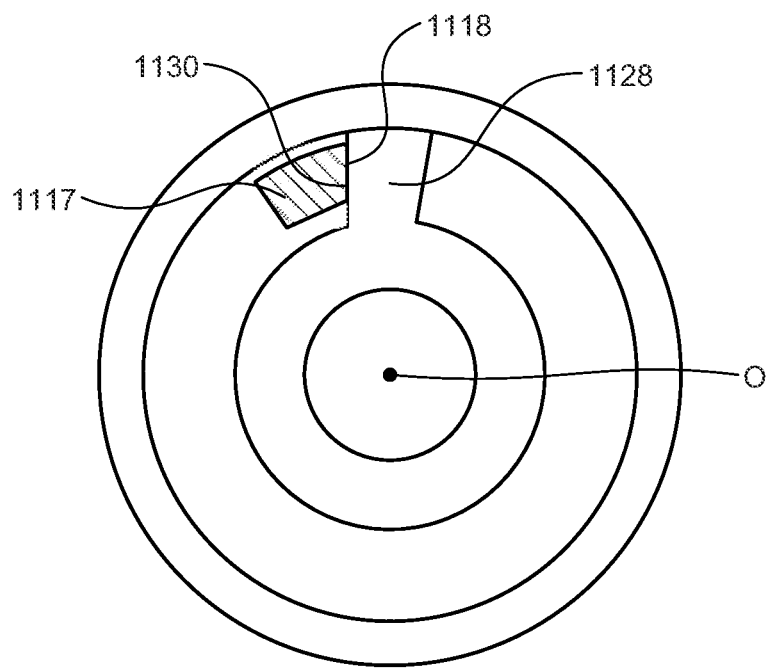
FIG. 14 is a sectional view illustrating a state in which a stopper and a protruding part are in contact with each other in a linear motion actuator of a comparative example.

FIG. 11 is a plan view of a piston of a seventh modification viewed from the second direction. FIG. 12 is a plan view of a nut of the seventh modification viewed from the first direction. FIG. 13 is a sectional view illustrating a state in which a stopper and a protruding part are in contact with each other in a linear motion actuator of the seventh modification. FIG. 14 is a sectional view illustrating a state in which a stopper and a protruding part are in contact with each other in a linear motion actuator of a comparative example.

As illustrated in FIG. 11, in a piston 120G of the seventh modification, a stepped face 130G is a face parallel to a face including the axis O and an imaginary line M1 extending perpendicularly from the axis O. Thus, when viewed from the axial direction, the edge of the stepped face 130G in the first direction X1 and the edge thereof in the second direction X2 overlap. When viewed from the axial direction, the stepped face 130G of the piston 120G of the seventh modification is placed (offset) with respect to the imaginary line M1 passing through a central part 128a of the stopper 128 in the circumferential direction and the axis O in the second rotational direction L2 and is parallel to the imaginary line M1. The distance between the imaginary line M1 and the stepped face 130G is a.

As illustrated in FIG. 12, in a nut 111G of the seventh modification, a contact face 118G is a face parallel to a face including the axis O and an imaginary line M2 extending perpendicularly from the axis O. Thus, when viewed from the axial direction, the edge of the contact face 118G in the first direction X1 and the edge thereof in the second direction X2 overlap. When viewed from the axial direction, the contact face 118G of the nut 111G of the seventh modification is offset with respect to the imaginary line M2 passing through the axis O in the second rotational direction and is parallel to the imaginary line M2. The distance between the imaginary line M2 and the contact face 118G is b. The distance a is larger than the distance b (a>b).

According to this seventh modification, when a protruding part 117G and a stopper 128G make contact with each other, the contact parts are the radially inside parts of the protruding part 117G and the stopper 128G. Thus, the load acting on the radially outside parts of the protruding part 117G and the stopper 128G is reduced.

As illustrated in FIG. 14, if the distance a and the distance b are equal (a=b), a contact face 1118 of a protruding part 1117 and a stepped face 1130 of a stopper 1128 will be in contact with each other in parallel (surface contact). Thus, the load acting on the radially outside parts cannot be reduced. The following describes an example in which the first end face of the piston is varied in shape.

Eighth Modification

Figure 15:
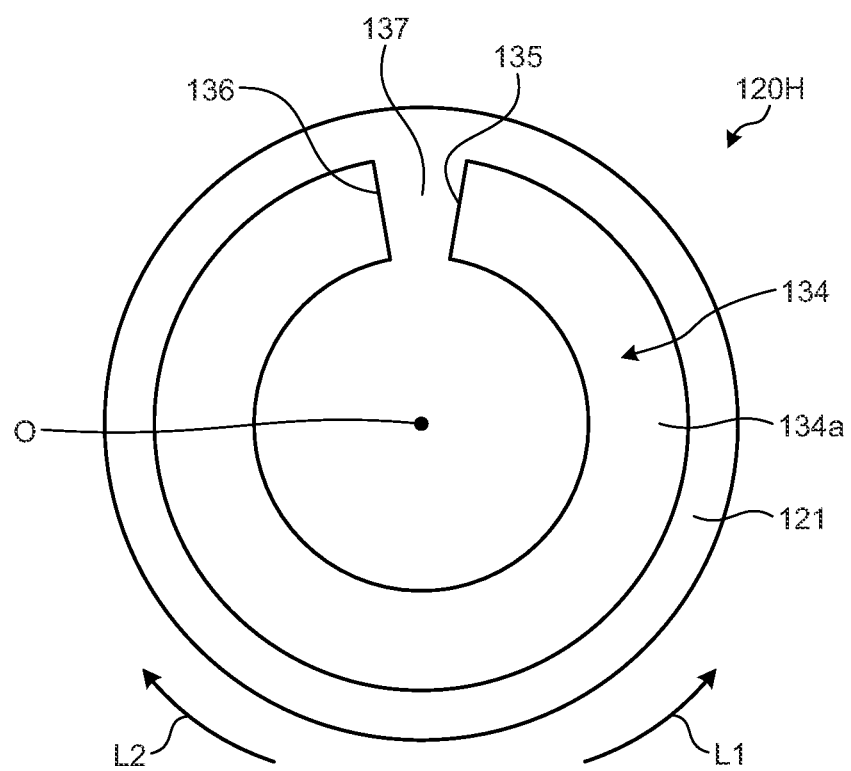
FIG. 15 is a plan view of a piston of an eighth modification viewed from the first direction.

FIG. 15 is a plan view of a piston of an eighth modification viewed from the first direction. As illustrated in FIG. 15, the first end face 121 of a piston 120H of the eighth modification is provided with a protruding streak 134 protruding in the first direction X1. The protruding streak 134 extends in the rotational direction and is arc-shaped (C-shaped). The protruding streak 134 overlaps the clearance groove part 127 (refer to FIG. 3) viewed from the axial direction. Thus, a plane 137 placed between both ends of the protruding streak 134 in the rotational direction overlaps the stopper 128 (refer to FIG. 3 and FIG. 4).

The amount of protrusion of the protruding streak 134 gradually increases as it is directed toward the first rotational direction L1. In other words, a protruding face 134a of the protruding streak 134 is a spiral-shaped spiral face. Thus, the end of the protruding streak 134 in the first rotational direction L1 is provided with a stepped face 135 between the protruding face 134a and the plane 137. On the other hand, the end of the protruding streak 134 in the second rotational direction L2 is provided with a ridgeline 136 formed by the protruding face 134a and the plane 137.

The amount of protrusion of the protruding streak 134 in the first direction X1 is equal to the recessed amount of the clearance groove part 127 in the first direction X1. In other words, the thickness of the protruding streak 134 in the axial direction from the protruding face 134a to the bottom face 129 of the clearance groove part 127 is constant in the circumferential direction.

According to the thus configured eighth modification, the axial thickness is equal in the piston 120H. In the piston 120 including the outer tube part 125 (refer to FIG. 3), when the piston 120 and the screw shaft 112 are assembled to each other, the stopper 128 and the stepped face 130 are covered by the outer tube part 125 and cannot be visually recognized (refer to FIG. 1). Thus, it is difficult to determine the phase of the stopper 128 and the stepped face 130 during assembly. On the other hand, according to the eighth modification, the stopper 128 and the stepped face 130 can be grasped through the plane 137 (the protruding streak 134). Thus, phase determination of the stopper 128 and the stepped face 130 is made easier.

Modifications facilitating phase determination of the stopper 128 and the stepped face 130 are not limited to the one described above. For example, the piston of the present disclosure may be provided with a keyway for rotation prevention on its outer circumferential face. This piston may then enable the phase of the stopper and the stepped face to be grasped with reference to the keyway. In addition, the first end face 121 or the outer circumferential face of the piston 120 may be marked with a mark.

Second Embodiment

Figure 16:
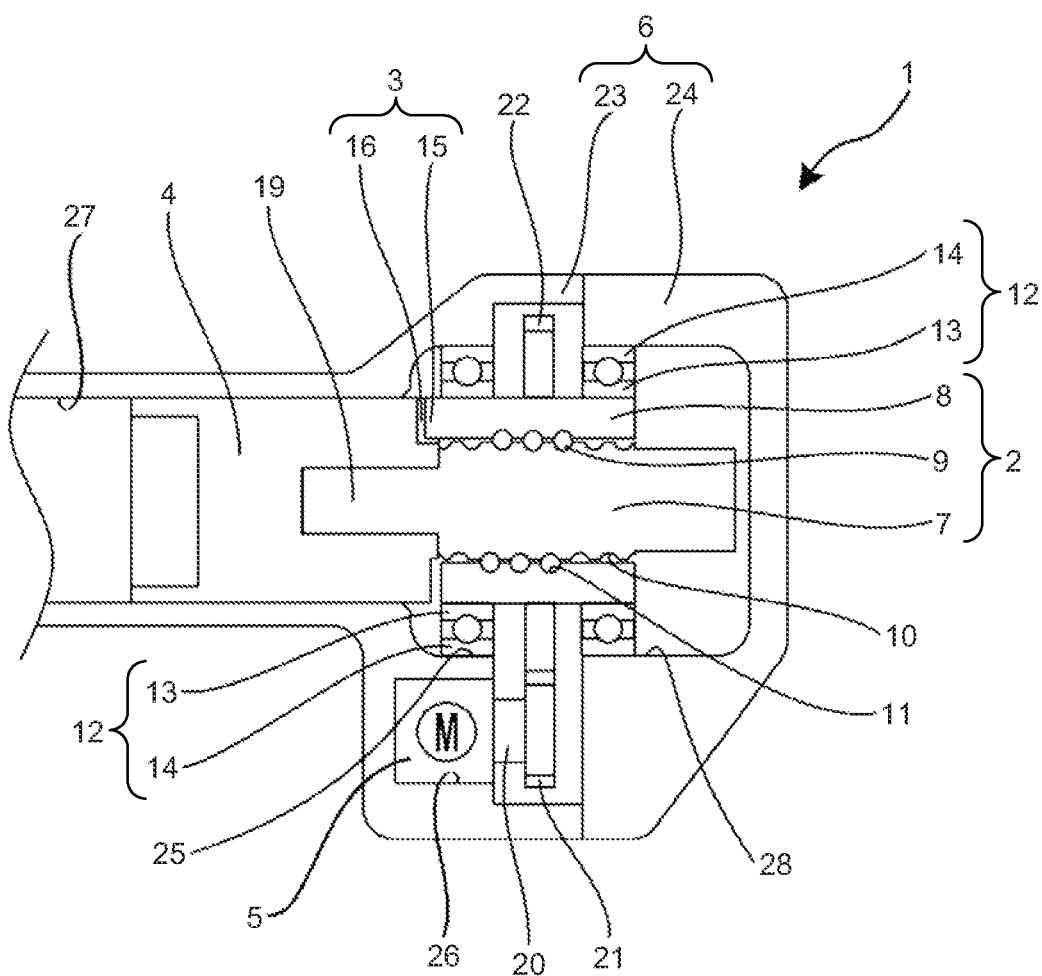
FIG. 16 is a sectional view of a linear motion actuator of a second embodiment.
Figure 17:
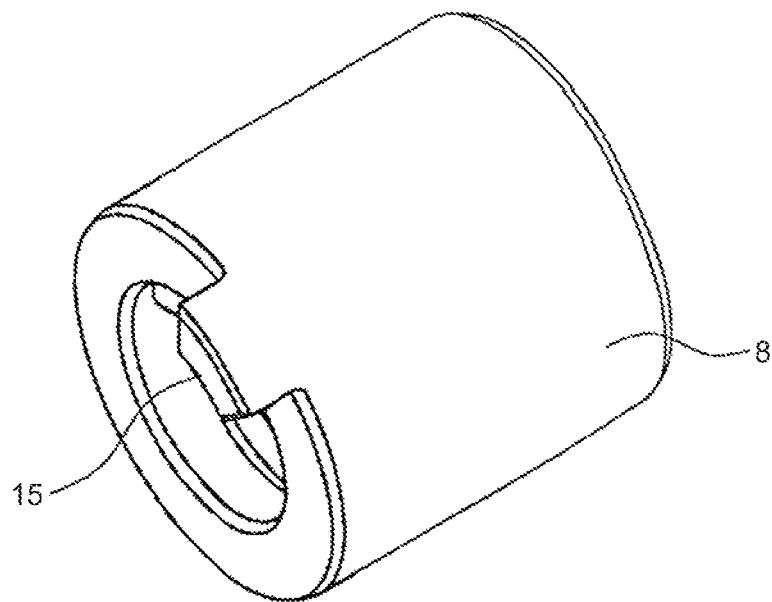
FIG. 17 is a perspective view of a nut of the second embodiment.
Figure 18:
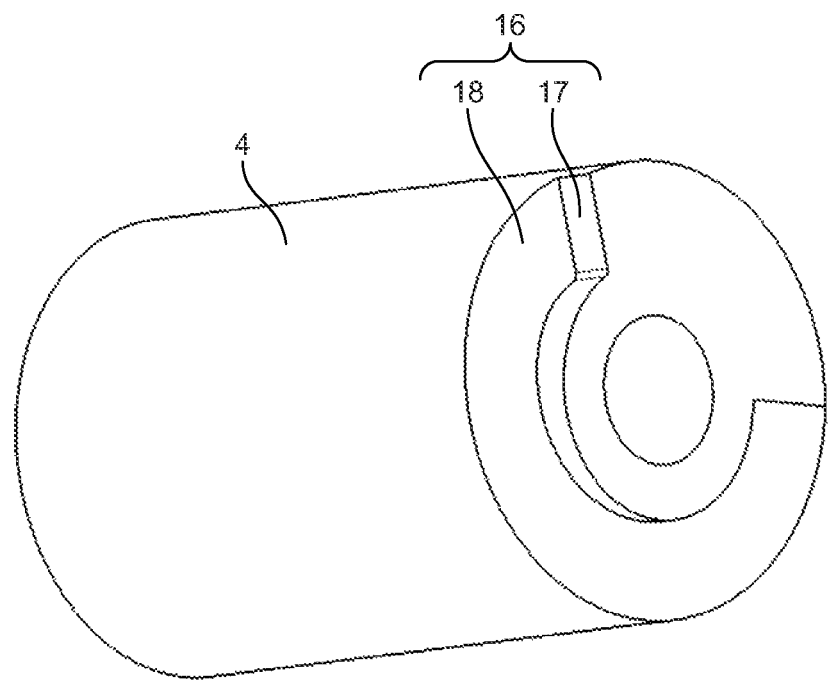
FIG. 18 is a perspective view of a piston of the second embodiment.

FIG. 16 is a sectional view of a linear motion actuator according to an embodiment of a second embodiment. FIG. 17 is a perspective view of a nut of the second embodiment. FIG. 18 is a perspective view of a piston of the second embodiment. FIG. 1 is a sectional view of a linear motion actuator 1 according to an embodiment. As illustrated in FIG. 16, the linear motion actuator 1 has a ball screw device 2, a stroke limiting mechanism 3, a piston 4, a motor 5, and a housing 6.

The ball screw device 2 includes a screw shaft 7, a nut 8, and a plurality of balls 9. The screw shaft 7 is provided with an outer raceway (first threaded groove) 10 on its outer circumferential face. The screw shaft 7 passes through the nut 8. The nut 8 is provided with an inner raceway (second threaded groove) 11 corresponding to the outer raceway (first threaded groove) 10 on its inner circumferential face. A spiral track (rolling path) is formed by the outer raceway (first threaded groove) 10 and the inner raceway (second threaded groove) 11. The balls 9 roll along the track (rolling path). The ball screw device 2 is supported by the housing 6 via ball bearings 12. As to the ball bearings 12, inner rings 13 are fit to both ends of the nut 8, whereas outer rings 14 are fit to the housing 6. With this structure, the screw shaft 7 and the nut 8 can move smoothly relative to each other. The inner rings 13 may be molded integrally with the nut 8.

The stroke limiting mechanism 3 includes a protruding part 15 (refer to FIG. 17) provided on one end face of the nut 8 and on the radial outside thereof and a locking part 16 provided in the piston 4, which is described below. With this structure, the relative displacement between the screw shaft 7 and the nut 8 is restricted at the stroke end of the screw shaft 7 in a contraction direction.

As illustrated in FIG. 18, the piston 4 is provided with the locking part 16. The locking part 16 is provided in a concave shape on an end face of the piston 4. The locking part 16 is formed from a stepped face (contact part) 17 and a clearance groove part 18. The protruding part 15 is in contact with the stepped face (contact part) 17. The clearance groove part 18 is deepened in accordance with the lead of the outer raceway (first threaded groove) 10. The piston 4 is coupled to a mounting part (shaft part) 19 provided on one end of the screw shaft 7, coaxially with the screw shaft 7. The piston 4 has a bottomed tubular shape, and the mounting part (shaft part) 19 is inserted into its inner diameter side. The piston 4 and the mounting part (shaft part) 19 are coupled to each other by serration fitting and press fitting to be coupled to each other in such a manner that the piston 4 and the mounting part (shaft part) 19 cannot rotate and the mounting part (shaft part) 19 does not slip out of the piston 4 in the axial direction. The material of the piston 4 is suitably an aluminum alloy or the like. The clearance groove part 18 may have the same depth over the entire face, or it may have a constant depth to the extent that the protruding part 15 is not in contact therewith.

The motor 5 is placed in the housing 6. The motor 5 has an output shaft (drive shaft) 20. A first gear (drive gear) 21 is provided at an end of the output shaft (drive shaft) 20. The first gear (drive gear) 21 meshes with a second gear (driven gear) 22 provided on an outer circumferential face of the nut 8. The first gear (drive gear) 21 transmits the rotation of the motor 5 to the nut 8 via the second gear (driven gear) 22. When the nut 8 rotates, the screw shaft 7 moves in the axial direction. In this way, the ball screw device 2 converts rotational motion into linear motion.

The housing 6 includes a first housing 23 and a second housing 24. The first housing 23 has a first large-diameter recessed part 25 with a larger diameter and a first small-diameter recessed part 26 with a smaller diameter. To the first large-diameter recessed part 25, the ball bearing 12 fit to one side of the nut 8 out of both ends of the nut 8 is fit. In the first small-diameter recessed part 26, the motor 5 is placed. The first large-diameter recessed part 25 has a second small-diameter recessed part 27 with a smaller diameter than the first large-diameter recessed part 25. The piston 4 is slidably fit into the second small-diameter recessed part 27. The second small-diameter recessed part 27 serves as a cylinder. The second housing 24 has a second large-diameter recessed part 28 of the same diameter as the first large-diameter recessed part 25 of the first housing 23. Into the second large-diameter recessed part 28, the ball bearing 12 fit to the other side of the nut 8 is fit.

Although in the present embodiment the stroke limiting mechanism 3 includes the protruding part 15 provided on the one end face of the nut 8 and the locking part 16 provided in the piston 4, the protruding part 15 of the nut 8 and the locking part 16 of the piston 4 may be provided in an opposite manner. Instead of providing the protruding part 15 directly on the end face of the nut 8, a hole may be drilled in the end face of the nut 8, and a pin may be inserted into the hole to make the protruding part 15. Furthermore, in accordance with the pin-shaped protruding part 15, the shape of the locking part 16 with which the pin-shaped protruding part 15 makes contact may be arc-shaped.

As described above, the linear motion actuator 1 of the present embodiment has the ball screw device 2, the stroke limiting mechanism 3, the piston 4, the motor 5, and the housing 6. The ball screw device 2 includes the screw shaft 7, the nut 8, and the balls 9. The stroke limiting mechanism 3 includes the protruding part 15 provided on the one end face of the nut 8 and the locking part 16 provided in the piston 4. The locking part 16 is provided in a concave shape on the end face of the piston 4. The locking part 16 is formed from the stepped face (contact part) 17 and the clearance groove part 18.

With this structure, by providing the conventional locking part 16, which has been provided in a separate component from the piston 4, in the piston 4, the strength of the locking part 16 can be improved without increasing the size of the component. Consequently, excessive stress concentration can be prevented from occurring in the stroke limiting mechanism 3 by a simple configuration.

In addition, by providing the locking part 16 in the piston 4, the separate component in which the conventional locking part 16 has been provided can be eliminated, or in other words, the parts count can be reduced. Furthermore, by the elimination of the separate component in which the conventional locking part 16 has been provided, the linear motion actuator 1 can be reduced in size.

The screw shaft 7 is coupled to the piston 4 via the mounting part (shaft part) 19 provided at the one end of the screw shaft 7, by which its displacement in the axial direction is guided by the piston 4. Consequently, the ball screw device 2 is inhibited from rattling, and the contact between the protruding part 15 and the stepped face (contact part) 17 in the stroke limiting mechanism 3 is stabilized, and wear on the protruding part 15 and the stepped face (contact part) 17 can be reduced.

REFERENCE SIGNS LIST

1 LINEAR MOTION ACTUATOR
2 BALL SCREW DEVICE

3 STROKE LIMITING MECHANISM
4 PISTON
5 MOTOR
6 HOUSING
7 SCREW SHAFT
8 NUT
9 BALL
10 OUTER RACEWAY (FIRST THREADED GROOVE)
11 INNER RACEWAY (SECOND THREADED GROOVE)
12 BALL BEARING
13 INNER RING
14 OUTER RING
15 PROTRUDING PART
16 LOCKING PART
17 STEPPED FACE (CONTACT PART)
18 CLEARANCE GROOVE PART
19 MOUNTING PART (SHAFT PART)
20 OUTPUT SHAFT (DRIVE SHAFT)
21 FIRST GEAR (DRIVE GEAR)
22 SECOND GEAR (DRIVEN GEAR)
23 FIRST HOUSING
24 SECOND HOUSING
25 FIRST LARGE-DIAMETER RECESSED PART
26 FIRST SMALL-DIAMETER RECESSED PART
27 SECOND SMALL-DIAMETER RECESSED PART
28 SECOND LARGE-DIAMETER RECESSED PART
100 LINEAR MOTION ACTUATOR
101 MOTOR
102 TRANSMISSION DEVICE
103 HOUSING
107 CYLINDER
110 BALL SCREW DEVICE
111, 111G NUT
111a INNER RACEWAY
112 SCREW SHAFT
113 BALL
116 ONE END FACE
117, 117G PROTRUDING PART
118, 118G CONTACT FACE
120, 120A, 120B, 120C, 120D, 120E, 120F, 120G, 120H PISTON
121 FIRST END FACE
122 SECOND END FACE
123 FITTING HOLE
124 INNER TUBE PART
125 OUTER TUBE PART
126 OPPOSITE FACE
127, 127A, 127B, 127C, 127D CLEARANCE GROOVE PART
128, 128G STOPPER
129, 129A, 129B, 129C, 129D BOTTOM FACE
129a SPIRAL FACE
129b FLAT FACE
130, 130E, 130G STEPPED FACE
131 RIDGELINE
131A STEPPED FACE
133 CORNER PART
134 PROTRUDING STREAK
135 STEPPED FACE
136 RIDGELINE
137 PLANE
140 STROKE LIMITING MECHANISM

The invention claimed is:

1. A linear motion actuator comprising:
a ball screw device having a screw shaft, a nut, and a plurality of balls;
a piston mounted on one end of the screw shaft; and
a stroke limiting mechanism setting an operation starting point at which the screw shaft starts operating in a first, the nut having:
one end face directed to the piston in the first direction; and
a protruding part protruding from the one end face, the piston having:
an opposite face directed to the one end face in a second direction, which is opposite to the first direction;
a clearance groove part recessed from the opposite face in the first direction arc-shaped about the screw shaft; and
a stepped face placed on an end of the clearance groove part in a first rotational direction in wall faces of the clearance groove part and facing a second rotational direction opposite to the first rotation direction, and
the stroke limiting mechanism is formed by the protruding part and the stepped face being in contact with each other.

2. The linear motion actuator according to claim 1, wherein
the piston has a bottom face of the clearance groove part exposed in the second direction in the wall faces of the clearance groove part, and
at least part of the bottom face is deeper in the first direction as the at least part of the bottom face is heading to the first rotational direction to be spiral.

3. The linear motion actuator according to claim 1, wherein
the piston has a bottom face of the clearance groove part exposed in the second direction in the wall faces of the clearance groove part, and
at least part of the bottom face extends in the first direction in stages as the at least part of the bottom face is heading to the first rotational direction to be a spiral staircase.

4. The linear motion actuator according to claim 1, wherein
the piston has a bottom face of the clearance groove part exposed in the second direction in the wall faces of the clearance groove part, and
at least part of the bottom face is a flat face.

5. The linear motion actuator according to claim 1, wherein the piston has a stopper in an area where the clearance groove part is not provided on the opposite face.

6. The linear motion actuator according to claim 5, wherein
the piston has an inner tube part positioned radially inside with respect to the stopper, the inner tube part having a fitting hole opening in the second direction into which the one end of the screw shaft is fit, and
a radial inside end of the stopper is connected to the inner tube part.

7. The linear motion actuator according to claim 5, wherein
the piston has an outer tube part positioned radially outside with respect to the stopper and having an outer circumferential face sliding with respect to a housing, and
a radial outside end of the stopper is connected to the outer tube part.

8. The linear motion actuator according to claim 1, wherein
- the piston has a first end face opposite to the opposite face in the first direction,
- the first end face is provided with a ridge protruding in the first direction, and
- an amount of protrusion of the ridge corresponds to a recessed amount of the clearance groove part.

9. The linear motion actuator according to claim 1, wherein
- the protruding part has a contact face for being in contact with the stepped face,
- the stepped face is parallel to a first imaginary line extending in a radial direction and is placed on the other of the rotational direction when viewed from an axial direction parallel to the screw shaft,
- the contact face is parallel to a second imaginary line extending in the radial direction and is placed on the other of the rotational direction when viewed from the axial direction, and
- a distance between the stepped face and the first imaginary line is larger than a distance between the contact face and the second imaginary line.

10. The linear motion actuator according to claim 1, wherein the nut is made of an iron-based material, and the piston is made of an aluminum alloy.

* * * * *